C. PASEL.
GUARD RAIL ATTACHMENT.
APPLICATION FILED NOV. 13, 1913.
1,154,335.
Patented Sept. 21, 1915.
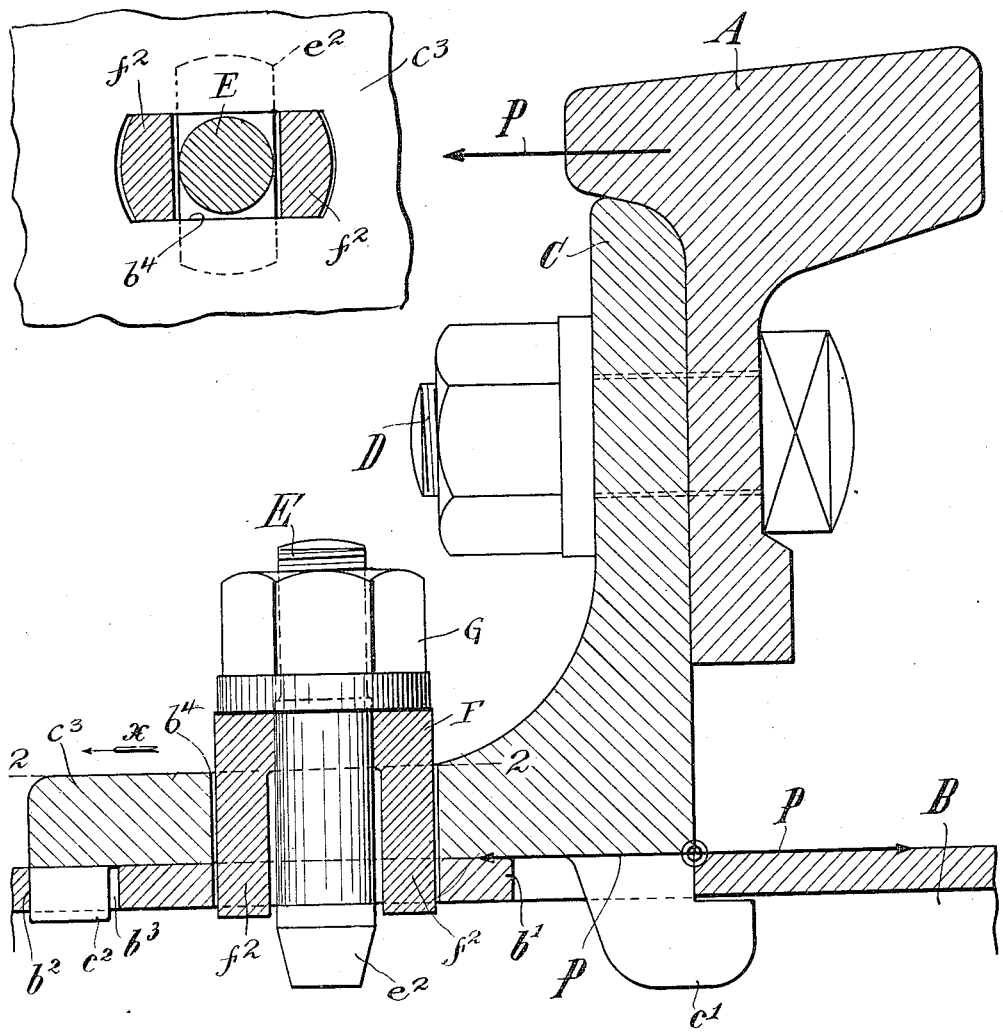

UNITED STATES PATENT OFFICE.

CLEMENS PASEL, OF ESSEN-RUHR WEST, GERMANY.

GUARD-RAIL ATTACHMENT.

1,154,335.

Specification of Letters Patent.

Patented Sept. 21, 1915.

Application filed November 13, 1913. Serial No. 800,840.

*To all whom it may concern:*

Be it known that I, CLEMENS PASEL, a citizen of the German Empire, residing at Essen-Ruhr West, Germany, have invented certain new and useful Improvements in Guard-Rail Attachments, of which the following is a specification.

This invention relates to a guard rail attachment with supporting angles for permanent ways laid with transverse sleepers, which is distinguished by the fact that the cost of upkeep for the permanent way is considerably reduced.

A constructional example of the subject matter of the invention is shown in the drawing where—

Figure 1 is a vertical cross section and Fig. 2 a horizontal section along line 2—2 of Fig. 1.

A is the guard rail, and B is an iron transverse sleeper upon which the guard rail is mounted by means of a supporting angle C. This latter, which is rigidly connected to the guard rail A by bolts D, has in the usual way on the end of its lower limb next to the running rail (not shown), two hooks $c^1$, which catch under the top $b^1$ of the sleeper and are designed to absorb the turning moment set up when a wheel bears against the guard rail. The lower limb of the supporting angle C also has on its end remote from the running rail a lug $c^2$, which bears against the side $b^2$ of a corresponding cavity $b^3$ provided in the top $b^1$ of the sleeper, and thus prevents any movement of the supporting angle C in the direction of the arrow $x$. The connection of the supporting angle C with the transverse sleeper is further secured by a bolt hook E introduced from above, and thereupon turned 90° to engage under the top plate $b^1$ of the sleeper B in the usual manner. For this purpose the sleeper is provided with an oblong hole $b^4$ and the bolt E with a flat cross head $e^2$. A washer F with two depending shanks or fingers $f^2$ is inserted between the nut G and the lower limb $c^3$ of the angle C in such a manner, that the fingers enter the hole $b^4$ on each side of the body of the bolt E. Both bolt and washer fit loosely in the hole $b^4$ and the fingers $f^2$ are somewhat longer than the added thickness of the top $b^1$ and the horizontal limb $c^3$ of the angle C, so that the ends of the fingers prevent any turning of the head $e^2$ when the parts are in position and the nut G is being tightened.

The function of the supporting angle C is to transmit the horizontal force P exerted upon the guard rail A to the sleeper B. If two equal but oppositely acting forces P be caused to act in the plane of the upper surface of the sleeper, the two forces acting in opposite directions on the vertical limb form a couple of forces, while the horizontal force P tends to move the supporting angle upon the foundation. This couple of forces is absorbed by the hook $c^1$, and the lug $c^2$ bearing against the side $b^2$ prevents any movement of the supporting angle C in the direction of the arrow $x$.

The provision of the lug $c^2$ provides the advantage that the bolt E, required to insure the connection is relieved from the pressure of the horizontal force, which tends to move the supporting angle C in the direction of the arrow $x$, so that the bolt may be made of very small dimensions and is given considerable lateral play both in the angle C and the sleeper B. It is therefore possible to make the bolt in the form of a bolt hook which can be introduced from above. It is by this particular construction of the bolt hook that the cost of maintenance is considerably reduced, as it is no longer compulsory when replacing a bolt to remove the ballast beneath the transverse sleeper. The stop which is formed by the side $b^2$ and prevents the movement of the supporting angle, may also obviously be replaced by a rib on the top of the sleeper against which the supporting angle bears. The lug $c^2$ would then be superfluous.

The above described guard rail attachment may also be used on wooden sleepers, if a foundation plate bolted to the wooden sleeper be provided for the supporting angle C.

Claims.

1. A guard rail attachment for permanent ways, comprising a supporting angle rigidly connected with the guard rail, the horizontal limb of said angle resting on a sleeper and being provided with a hook, said hook extending through an aperture in the sleeper so as to engage beneath the sleeper and facing in the direction of the running rail, the other extremity of said horizontal limb engaging directly with the sleeper so as to transmit any side thrust from said angle to said sleeper, the abutment surfaces between said angle and said sleeper running parallel to the longitudinal direction of the angle.

2. A guard rail attachment for permanent ways comprising a supporting angle rigidly connected with the guard rail; the horizontal limb of said angle resting on a sleeper and being provided with a hook, said hook extending through an aperture in the sleeper so as to engage beneath the sleeper and facing in the direction of the running rail, the other extremity of said horizontal limb engaging directly with the sleeper so as to transmit any side thrust from said angle to said sleeper, the abutment surfaces between said angle and said sleeper running parallel to the longitudinal direction of the angle; and holding-down means between said angle and the sleeper.

3. A guard rail attachment for permanent ways, comprising a supporting angle rigidly connected with the guard rail, the horizontal limb of said angle resting on a sleeper and being provided with a hook, said hook extending through an aperture in the sleeper so as to engage beneath the sleeper and facing in the direction of the running rail, the other extremity of said horizontal limb engaging directly with the sleeper so as to transmit any side thrust from said angle to said sleeper, the abutment surfaces between said angle and said sleeper running parallel to the longitudinal direction of the angle; a holding-down bolt for said angle engaging beneath said sleeper, said bolt having lateral play in the angle and the sleeper, whereby the bolt will be subjected to tension alone and transmitting the vertical thrust from said angle to said sleeper.

In testimony whereof I have affixed my signature in presence of two witnesses.

CLEMENS PASEL. [L. S.]

Witnesses:
 HELEN NUFER,
 ALBERT NUFER.

Copies of this patent may be obtained for five cents each, by addressing the "Commissioner of Patents, Washington, D. C."